United States Patent
Stefanik et al.

(10) Patent No.: US 9,864,884 B2
(45) Date of Patent: Jan. 9, 2018

(54) SYSTEM FOR CHARACTERIZING A PASSIVE ANTENNA NETWORK AND ELEMENTS IN A DISTRIBUTED ANTENNA SYSTEM

(71) Applicant: Andrew Wireless Systems GmbH, Buchdorf (DE)

(72) Inventors: Joerg Stefanik, Donauwoerth (DE); Alfons Dussmann, Gansheim (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 0 days.

(21) Appl. No.: 15/211,148

(22) Filed: Jul. 15, 2016

(65) Prior Publication Data
US 2017/0017816 A1    Jan. 19, 2017

Related U.S. Application Data

(60) Provisional application No. 62/193,401, filed on Jul. 16, 2015.

(51) Int. Cl.
*G06K 7/10* (2006.01)
*G06K 19/07* (2006.01)
(Continued)

(52) U.S. Cl.
CPC ..... *G06K 7/10356* (2013.01); *G06K 19/0723* (2013.01); *H04B 17/17* (2015.01); *H04W 24/06* (2013.01); *H04W 88/085* (2013.01)

(58) Field of Classification Search
CPC ........... G06K 7/10366; G06K 7/10009; G06K 19/0723; G06K 7/10316; G06K 7/10356; G06K 19/0717; G06K 7/10128
(Continued)

(56) References Cited

U.S. PATENT DOCUMENTS

| 8,301,077 B2* | 10/2012 | Xue | ................ H01Q 1/242 370/315 |
| 2013/0201006 A1* | 8/2013 | Kummetz | ............ H04Q 1/138 340/10.1 |

FOREIGN PATENT DOCUMENTS

| EP | 2343562 | 7/2011 | |
| EP | 2343562 A2 * | 7/2011 | ........ G01R 31/024 |
| WO | 2012083668 | 6/2012 | |

OTHER PUBLICATIONS

International Search Authority, "International Search Report for PCT/EP2016/066994", "from U.S. Appl. No. 15/211,148", dated Oct. 5, 2016, pp. 1-11, Published in: WO.

* cited by examiner

*Primary Examiner* — Mark Blouin
(74) *Attorney, Agent, or Firm* — Fogg & Powers LLC

(57) ABSTRACT

A distributed antenna system includes a plurality of remote antenna units with a passive element coupled to at least one of the remote antenna units at a connection juncture. An RFID system is associated with the first passive element and has RFID data identifying the first passive element. An interrogator unit is associated with the remote antenna unit and is configured for generating a least one signal for transmission to the passive element to be reflected at the connection juncture and received at the interrogator unit. The interrogator unit is also configured for generating at least one signal for transmission to the RFID system to obtain the RFID data identifying the passive element. Processing circuitry processes the reflected signal and measures a parameter of the first passive element. The processing circuitry correlates the measured parameter with the RFID data for the passive element.

19 Claims, 3 Drawing Sheets

(51) Int. Cl.
*H04W 24/06* (2009.01)
*H04B 17/17* (2015.01)
*H04W 88/08* (2009.01)

(58) Field of Classification Search
USPC ........................................ 340/10.1
See application file for complete search history.

SYSTEM FOR CHARACTERIZING A PASSIVE ANTENNA NETWORK AND ELEMENTS IN A DISTRIBUTED ANTENNA SYSTEM

CROSS-REFERENCE TO RELATED APPLICATIONS

This application claims the benefit of U.S. Provisional Patent Application Ser. No. 62/193,401, filed on Jul. 16, 2015, which is hereby incorporated herein by reference.

FIELD OF THE INVENTION

Embodiments of the invention are directed to wireless communication systems, and specifically directed to a distributed antenna system for wireless communications.

BACKGROUND OF THE INVENTION

Distributed antenna systems (DAS) can be used in confined areas to deploy wireless coverage and capacity to mobile devices. A DAS can include active elements such as master units, extension units, and remote units. Among the variety of active elements, a typical DAS may include passive elements as well. Examples of such passive elements are: coaxial cables, RF splitters, RF combiners, RF antennas, optical fiber, optical splitters, optical combiners, attenuators, dummy loads, cable feeds, and surge protectors. Other passive RF or optical devices can include connectors, jacks, wall jacks, and patch cords.

Systems are presented for detecting the presence of passive RF or passive optical devices that are present in a DAS. The presence of such device can be facilitated through the employment of radio frequency identification (RFID) chips. One aspect includes coupling the RFID chip to the device that is to be detected. In one aspect of such systems, a coupling network is used to couple to a signal wave inside of a waveguide such as coaxial cable, optical fiber or other type of waveguide. Examples of the coupling network are resonant coupling networks, bandpass filters, low pass filters, high pass filters, and directional or non-directional couplers. One purpose of the coupling network is to pass a maximum of RF energy coming from the interrogator or RFID reader to the RFID chip. Another feature of such systems is that they block other signals used in the DAS at different frequencies than the RF interrogator frequency to avoid potential generation of intermodulation products by the potential non-linear characteristic of the RFID chip.

In such systems, a DAS is provided that includes one or more passive elements. Each passive element can be associated with an RFID chip. The RFID chip may be integrated into the passive element or may be coupled, connected, or otherwise associated with the passive element. A reader may be integrated within or otherwise associated with a subsystem of the DAS that is remote from at least some of the passive elements. The reader can transceive RFID signals over a communications network of the DAS. The communications network may include, for example, coaxial cable or another transmission medium that can carry RF signals and RFID signals through the DAS. For example, the reader may transmit an RFID signal that is carried by the communications network through a coupling network to the RFID chip associated with a passive element.

The RFID chip can respond to the RFID signal with a responsive signal representing an identifier of the passive element. The responsive signal can be received from the coupling network and transported by the communications network to the reader. The reader may extract the identifier from the responsive signal and provide the identifier to a controller. The passive element may not be required to be powered for a reader to detect the presence of the passive element. Both the reader and the RFID chip may be configured to be in a fixed position within the DAS, as opposed to the reader being moveable. In other aspects, the reader includes one or more readers that are moveable.

An RFID chip may be any item that can respond to an RFID signal with a responsive signal representing an identifier for the item. An "RFID chip" may also be known as an "RFID tag."

One such system is described in U.S. patent application Ser. No. 13/798,517, filed Mar. 13, 2013 and entitled "Detecting Passive RF Components Using Radio Frequency Identification Tags", which application is incorporated herein by reference in its entirety.

To fully characterize a passive network beyond the active boundaries of a distributed antenna system, additional information is necessary, beyond determining the presence and identification of passive RF devices. The location, physical distance and layout and insertion loss of such elements is desired. Therefore, there is a need for such a DAS system that, in addition to determining the presence and identification of various passive elements in a DAS, can further provide other characteristics and parameters for passive elements in the DAS.

SUMMARY

One embodiment is directed to a distributed antenna system comprising a plurality of remote antenna units. A first passive element is coupled to at least one of the remote antenna units at a connection juncture. The distributed antenna system further comprises an RFID system associated with the first passive element and having RFID data identifying the first passive element and an interrogator unit associated with the remote antenna unit. The interrogator unit is configured for generating a least one signal for transmission to the passive element to be reflected at the connection juncture and received at the interrogator unit. The interrogator unit is configured for generating at least one signal for transmission to the RFID system to obtain the RFID data identifying the passive element. The distributed antenna system further comprises processing circuitry for processing the reflected signal and for measuring a parameter of the first passive element, the processing circuitry further configured for correlating the measured parameter with the RFID data for the passive element.

Another embodiment is directed to a method of characterizing a first passive element of a distributed antenna system that comprises a plurality of remote antenna units. The first passive element is coupled to at least one of the remote antenna units at a connection juncture. The method comprises generating, by an interrogator unit associated with the remote antenna unit, at least one signal for transmission to the passive element to be reflected at the connection juncture and received at the interrogator unit. The method further comprises generating, by the interrogator unit, at least one signal for transmission to an RFID system associated with the first passive element, to obtain RFID data identifying the first passive element. The method further comprises processing the reflected signal and measuring

It should be understood that the appended drawings are not necessarily to scale, presenting a somewhat simplified representation of various preferred features illustrative of the basic principles of embodiments of the invention. The specific design features of the system and/or sequence of operations as disclosed herein, including, for example, specific dimensions, orientations, locations, and shapes of various illustrated components, will be determined in part by the particular intended application and use environment. Certain features of the illustrated embodiments may have been enlarged, distorted or otherwise rendered differently relative to others to facilitate visualization and clear understanding.

DETAILED DESCRIPTION OF THE INVENTION

The present invention provides a system incorporating RFID technology to determine the network presence, location and layout of the passive devices. The passive RF elements of the inventive system incorporate RFID systems (chips) that are closely coupled to the otherwise passive RF elements or RF input or output. Time Domain Reflectometry (TDR) is used in combination with the RFID systems in order to identify passive network elements and locate them in the network structure. The RFID system receives an interrogator signal or a sequence of interrogator signals and uses the energy to prepare a response. In addition to the regular RFID response including the unique ID, the reflections of the incident signals are also used with a TDR analysis for determining other information regarding the passive network and its elements.

The interrogator transceiver for sending signals may be located at a feed point of the passive DAS, such as a coverage port of a DAS remote unit, and collects not only RFID information, but also reflected signals to process, analyze, and make determinations of the layout (interconnectivity and location), and other information relevant for the operation and maintenance of the passive DAS system.

Figure 1:
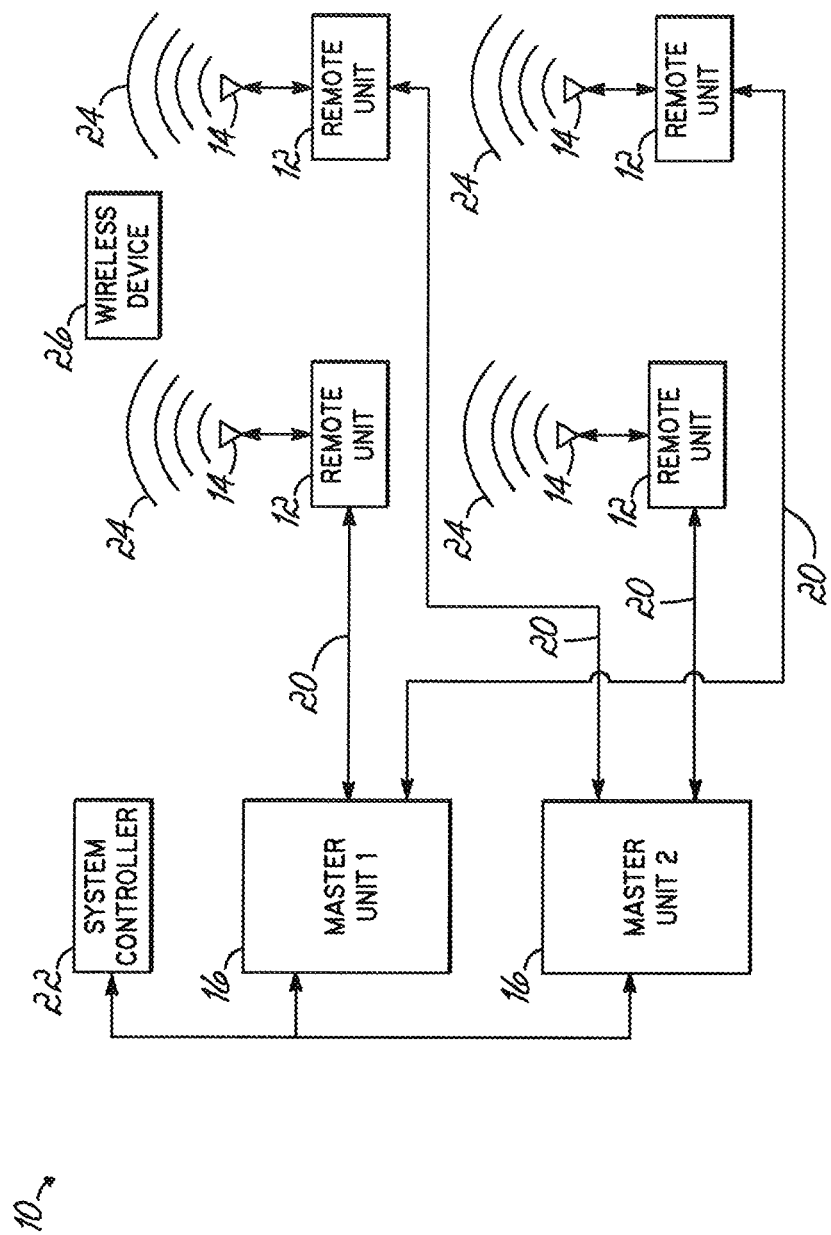
FIG. 1 is a block diagram of a distributed antenna system for implementing the present invention.

FIG. 1 illustrates a block diagram depicting an embodiment of a DAS for incorporating various aspects of the invention. The DAS 10 can include one or more master units 16 as a donor device that are coupled to one or more remote units or remote antenna units 12 for coverage. The DAS 10 can communicate with one or more base stations or other signal sources (not shown) via a wired or wireless communication medium as appropriate. The DAS and the master units 16 communicate uplink and downlink signals between the base stations and one or more remote antenna units 12 distributed in an environment, such as an indoor environment, to provide coverage within a service area of the DAS 10. The master units 16 can convert downlink signals received from the base station or signal source, such as RF signals, into one or more data streams for transmission to the remote antenna units 12. The data streams consist of the representation of the RF communication signals and communication data between a system controller 22 and remote unit controller as discussed herein. The data streams might be digital or analog data streams or may include both digital and analog data. The remote antenna units 12 can convert digital data streams to RF signals. The remote antenna units 12 can amplify the downlink signals and radiate the downlink signals 24 to terminal equipment or customer equipment, such as one or more wireless communication devices 26. Uplink signals are handled similarly in the uplink direction and are received from the devices 26 by the remote antenna units 12 and converted from RF to digital data streams and transmitted to the master units 16 and beyond.

A system controller 22 can control the operation of the master units 16 for processing the signals communicated with the remote antenna units 12. The signals communicated with the remote antenna units 12 may be the uplink and downlink signals of the DAS 10 for communicating with terminal equipment. The master units 16 can provide downlink signals to the remote antenna units 12 via the links 20. The links 20 can include any communication medium suitable for communicating data signals between the master unit 16 and the remote antenna units 12. The signals may be communicated electrically or optically. Non-limiting examples of a suitable communication medium for the links 20 can include copper wire (such as a coaxial cable), optical fiber, and microwave or optical communication links.

Although the DAS 10 is depicted as including a couple master units 16 and remote antenna units 12 coupled to a master unit, any number (including one) of each of master unit 16 and remote antenna units 12 can be used. Furthermore, a DAS 10, according to some aspects, can be implemented without system controller 22.

Figure 2:
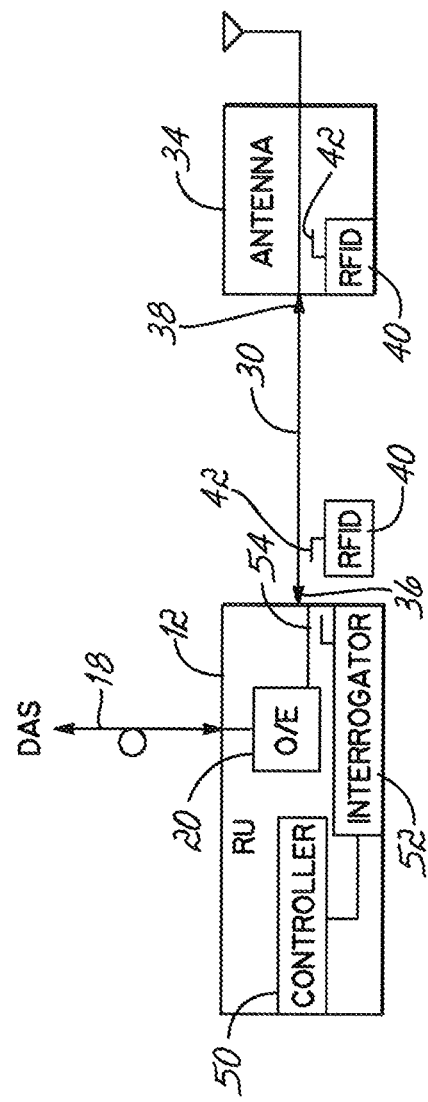
FIG. 2 is a block diagram of passive elements of a distributed antenna system consistent with an embodiment of the invention.

FIG. 2 is a block diagram of an exemplary remote antenna unit 12 configured for performing TDR measurements and correlating the measurements with RFID data and information related to various passive elements within the DAS network. The remote antenna units (RU) 12 may be incorporated with larger overall DAS through a suitable communication medium 18. Conversion circuitry 20 might be implemented, such as to convert optical signals to electrical signals for transmission to one or more antennas 34. The remote unit 12 may be coupled to the antenna 34 through a suitable communication medium or waveguide, such as a coaxial cable 30. Appropriate connector elements of the cable 30 define connection junctures 36, 38 associated with the passive elements. For example, connection juncture 36 is associated with the passive element of cable 30 that connects the remote unit 12 and another possible passive element of antenna 34, and indicates a location of one end of the cable. The connection juncture 38 is associated with the antenna 34, and the location thereof. For example, the cable 30 might be connected to the coverage port of a remote unit 12 at one end to define juncture 36. The other end of cable 30 connects with coverage antenna 34 to define connection juncture 38. In accordance with one aspect of the invention, RFID systems, such as tags, are associated with passive elements and might be located in the cable connectors and/or the base of the antenna, or might be closely located at the junctures 36, 38 for providing information identifying the cable 30 and antenna 34, or some other passive element. In that way, the DAS remote unit 12 might scan the antenna network, and retrieve the information identifying passive elements such as cable 30 and antenna 34 from received RFID data. Additionally, signal wave reflections associated with the various connection points or junctures 36, 38 might be utilized for measuring parameters of the various passive elements, as discussed herein.

In one embodiment, Time Domain Reflectometry (TDR) is used for measuring parameters of the passive elements. As illustrated in the figures, the RFID systems/tags 40 are coupled in the signal path and with the passive elements using appropriate coupling circuits or devices 42. For sending signals for the TDR measurement, as well as for the interrogation of the RFID systems 40, suitable interrogation and transceiver circuitry, in the form of an interrogator 52 may be implemented in the remote unit 12, and appropriately coupled through a coupling device 54 to the cable 30 and other passive elements, such as antenna 34.

Each of the RFID systems 40 associated with a passive element at a connection juncture can include a unique, non-removable, and tamper-proof serial number or other data to describe technical characteristics of the passive element, similar to an RFID tag, and each of the RFID systems 40 can allow the respective passive component to be identified. The RFID interrogator/transceiver 52 might have suitable processing circuitry therein to handle the processing of TDR signals for parameter measurements and RFID data signal handling in accordance with the invention. Alternatively, a system controller 50 that is in communication with an RFID interrogator/transceiver 52 or other reader/interrogator system in the remote antenna unit 12 might have processing circuitry for handling processing tasks. The interrogation process can be initiated in a number of ways, such as by the system controller 50 or interrogator 52, or by the master unit system controller 22. One or more incident signals are generated and sent by the interrogator 52 to measure and identify the passive DAS elements. The RFID interrogator 52 can transmit the incident signal(s) through an appropriate coupling device or circuit 54. The coupling device 54 can be a directional coupler or a non-directional coupler. In one example, the coupling device 54 can have a coupling ratio of −10 dB or smaller with respect to the coaxial cable 30 in the direction to the RFID systems and associated passive elements. In other aspects, the RFID interrogator 52 can transmit the signal(s) via a low pass, band pass, or high pass filter.

For coupling the RFID signals in accordance with the invention, various appropriate coupling circuits or devices 42 might be used. For example, an RFID system 40 of a passive element might be coupled to another passive component, such as a coaxial cable 30 or other waveguide, via a resonant coupling circuit 42 that includes an attenuation and matching circuit. One coupling circuit 42 might use a capacitor and an inductor arrangement to have a certain resonant characteristics. The resonance frequency can be the operational frequency of the RFID system 40. For frequencies separate from the resonance frequency, the coupling circuit 42 can provide a high impedance to minimize negative impacts from signals used for mobile communication via the DAS 10. Non-limiting examples of negative impacts from signals used for mobile communication can include reflection and loss to other signals on different frequencies. An attenuation and matching circuit can include attenuation devices. Other implementations are also possible. In other aspects, a Balun component, such as (but not limited to) a transformer, can be used in place of the attenuation devices. In additional or alternative aspects, the RFID system of the invention can be coupled to the coaxial cable 30 or another passive component via a non-resonant coupling circuit, such as a directional coupler. The directional coupler can be used with a coupling optimized for signals communicated with the RFID interrogator 52 and selected for suppressing potential intermodulation products generated by the RFID system 40 in the direction of one or more antennas.

For providing interrogation of the RFID systems 40 of the invention, an interrogation signal from interrogator 52 can be communicated via the coaxial cable 30. The interrogation signal can experience some loss due to the nature of the coaxial cable 30 or other waveguide. One or more of the RFID systems 40 can receive an interrogation signal that has a signal level above a predetermined threshold for the RFID system. Non-limiting examples for such a threshold include signal levels between −15 dBm and −18 dBm. One or more of the RFID systems 40 can receive the incident interrogation signal via a respective one of the coupling circuits 42. One or more of the RFID systems 40 can then generate a responsive signal that contains RFID data. The responsive signal can be communicated back to the RFID interrogator 52 via the coaxial cable or other waveguide.

In accordance with one aspect of the invention, interrogator 52 is configured for generating at least one incident signal for transmission to a passive element to be reflected at a connection juncture associated with that passive element, and the location of that passive element in the network. The reflected signal is processed for measuring a parameter of the passive element. In one embodiment, a TDR method is used in order to measure reflections along the conductor, such as along cable 30, and at the connection juncture of the various passive elements. Assuming that the conductor (e.g., cable 30) is of uniform impedance, the various connectors defining connection junctures, such as 36, 38 that define connection locations between the various network elements such as cable 30 and antenna 34, will introduce impedance variations in the transmissions mediums, such as cable 30. TDR, or Time Domain Reflectometry, is a measurement technique that is used to determine parameters and characteristics of a passive element by observing the reflected signal waveforms associated therewith. For example, the impedance parameters at a discontinuity, such as connection junctures 36, 38, can be determined from the amplitude of the reflected signal. Also, a parameter, such as the distance to the reflecting impedance, can be determined from the time that an incident measurement pulse would take to return from a reflection point (36, 38) back to interrogator 52, for example. More specifically, at the point of the impedance variation, the incident signal will be reflected back toward the signal source, such as interrogator 52. The signal propagation delay is correlated with the distance from that signal source. In that way, a parameter, such as the length of the transmission medium, such as cable 30, is determined by looking at the transmitted and the received interrogation signal or other signals for junctures 36, 38 in the time domain.

Referring to FIG. 2, various RFID systems/tags 40 may be located in the cable connectors at the remote unit output port (36), and at the base of the antenna 34 (38). One or more measurements/interrogation signals are sent by interrogator 52 so that the DAS remote unit 12 can scan the passive network, and retrieve the information identifying the cable 30, as well as antenna 34. The RFID systems 40 associated with the various passive elements at the cable connector and the base of antenna 34 respond to the interrogation signal to return RFID data to the interrogator 52 for the proper identification of those passive elements. Processing circuitry in the interrogator and/or controller 50 receives the RFID data.

In accordance with another aspect of the invention, that measurement/interrogation signal will also provide a reflection associated with each of the connection junctures 36, 38 associated with the connection points or locations for the passive elements. That reflection information from a reflected signal is used by the processing circuitry of interrogator 52 and/or controller 50, and is processed according to an appropriate TDR methodology, for example, to evaluate a parameter, such as the distance between the coverage port of the remote unit 12 and antenna 34. Processing circuitry in the interrogator and/or controller 50 correlates the returned RFID data and the measured distance parameter information from the TDR processing in order to characterize each of the passive elements in the network and their distance from the coverage port of the remote unit 12.

In addition to the distance information, the TDR processing may also provide the magnitude of the impedance mismatch at the various connection junctures 36, 38. The impedance magnitude information may be used to identify any damaged passive network elements, and to also yield information on the physical distance of those damaged elements from the signal source, such as the interrogator 52 and the remote unit 12.

In accordance with another aspect of the invention, insertion loss of the passive network elements is measured. The insertion loss measurement may be made in a number of ways. In one example, utilizing the TDR methodology, by making the end of a cable produce a total reflection (such as by switching or connecting it to an open circuit termination or short circuit termination), then the interrogator might determine the loss from comparing the power of the transmitted signal with the received signal. In another example, if the transmitted RFID power is known, it can be compared with a measured received RFID power, and the loss between the transmitter and receiver can be calculated. With the knowledge of the cable insertion loss characteristics from the RFID data and the received power at the used frequency, the cable insertion loss at other frequencies could also be estimated.

In accordance with one aspect of the invention, a single signal is used for RFID data and also for obtaining a reflected signal for measurement purposes. For example, the TDR measurement signal may also act as an interrogation signal for the RFID systems 40. The TDR signal is used as a trigger for the RFID system or chip 40 to send the RFID data in response. The reflection information provided at various connection junctures and impedance mismatches, and the measured parameters associated therewith, may then be correlated with the RFID data so that distance measurements and other parameter measurements are correlated with a specific identified passive element. That is, the obtained RFID data and reflection may arrive at the interrogator 52 close enough in time to provide such a correlation through the passive circuitry.

In an alternative embodiment, as discussed herein, a separate signal might be used to obtain RFID data, and another signal used, such as a pulse signal, to obtain a reflected signal for measuring one or more parameters of a passive element utilizing a TDR methodology or other methodology.

Figure 3:
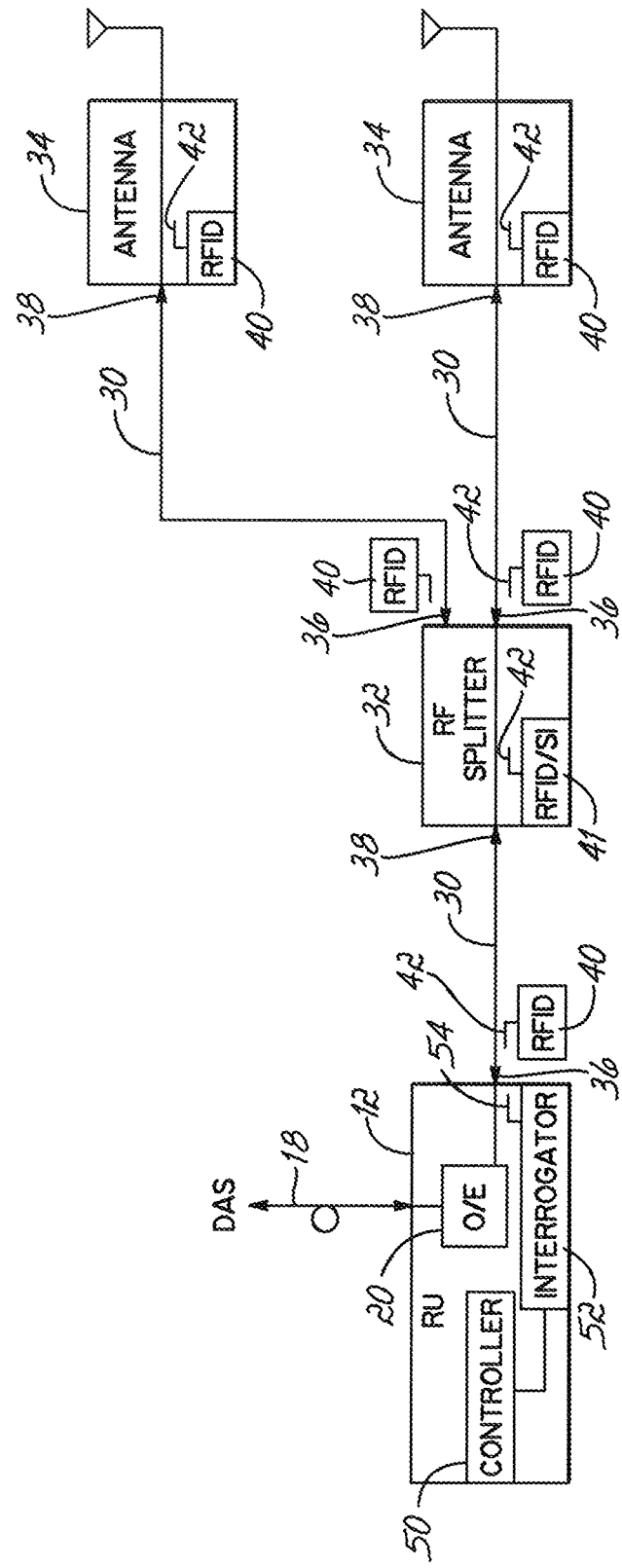
FIG. 3 is a block diagram of passive elements of a distributed antenna system consistent with another embodiment of the invention.

FIG. 3 illustrates a more complex antenna network implementing the invention. Specifically, multiple antennas 34 are coupled with the remote unit 12 through an appropriate passive RF splitter 32 and cables 30. Various of the RFID systems 40 might be coupled at appropriate connection junctures 36, 38 associated with the cables 30 that connect the RF splitter to the remote unit, and the multiple antennas 34 to the RF splitter 32.

As noted herein, interrogator 52 and/or controller 50 will process the reflected TDR signals as well as the RFID data to characterize the passive network and the elements therein. As may be appreciated, the processing circuitry of the interrogator/controller may have to process multiple reflections and correlate the TDR information and measured parameters associated with those reflections with specific RFID data to provide information regarding the particular passive element or connection point that is associated with the reflections and measured parameters. The different propagation times associated with TDR reflections and the return of RFID data from the RFID systems 40 may be addressed in accordance with one aspect of the invention. For example, for TDR methods, you often only need a short pulse signal that is sent and somewhat quickly reflected and returned. For gathering RFID data, on the other hand, it may be necessary to send a longer signal in order to trigger the RFID system. Because of the different propagation aspects, the interrogator/controller might receive all of the TDR reflections before the RFID systems 40 have sent their information. As a result, the interrogator/controller is configured with appropriate logic to match the TDR reflection information and other measurements to specific RFID data that identifies the passive elements that are associated with measured parameters.

To assist in that processing, in accordance with one aspect of the invention, other interrogators might be implemented that operate as "slave" interrogators with interrogator 52 in the remote unit operating as a "master" interrogator. To that end, as illustrated in FIG. 3, a slave interrogator (SI) 41 might be incorporated, for example, into the RF splitter 32 that connects with multiple antennas 34. In one embodiment as illustrated, the slave interrogation functionality might be incorporated within the processing circuitry of the RFID system so that element 41 provides functionality both as an RFID system that provides RFID data, as well as an interrogator. Because of its location in a passive element such as an RF splitter, the slave interrogator 41 may not have a power source. In one embodiment, the slave interrogator 41 is charged by interrogator 52, which is considered the master interrogator. For example, one or more signals may be sent from master interrogator 52 to slave interrogator 41 in order to charge and power the slave interrogator 41. Then, the slave interrogator 41 sends the RFID interrogation signal and/or TDR pulse signals to the passive elements, such as cable 30, and the various antennas 34. The returned RFID data and/or reflected TDR pulses are then returned back to the master interrogator 52, where they are processed for measuring certain parameters and correlated to provide information regarding the different passive elements, in accordance with the invention.

In an alternative embodiment of the invention, the slave interrogator 41 will be similarly energized by the master interrogator 52 and signals therefrom. However, the slave interrogator 41 is also configured with appropriate processing circuitry to process RFID data and/or TDR pulse data. The slave interrogator sends interrogation signals/TDR pulses in a single branch or path from the RF splitter 32, such as to a specific antenna 34. The slave interrogator 41 then receives the TDR reflection and/or any RFID data associated with the passive elements in that branch. The slave interrogator 41 can then proceed to the next branch sequentially, until all of the various antenna elements 34 and order passive elements have been addressed. The slave interrogator 41 then processes the RFID information, and parameter measurement information resulting from TDR processing, and sends that information back to the master interrogator 52.

As noted herein, a single pulse or signal might be sent by an interrogator to act as both an RFID interrogation signal, as well as the TDR pulse. The returned RFID data is then correlated with the specific TDR reflection so that TDR parameter measurement information may be associated with a specific passive element in the DAS network.

Alternatively, different signals might be sent to affect the RFID features of the RFID systems 40, 41 separate from the TDR measurements. For example, one or more RFID interrogation signals may be sent to energize a particular RFID system 40, 41 so that it can prepare a suitable response to return the RFID data associated with that system and with the particular passive network element. Then, the interrogator sends a TDR pulse signal, which acts as a trigger for the RFID system. The TDR pulse is reflected, and a received reflected signal is processed and used for the noted TDR measurements. The triggered RFID system also returns RFID data to the interrogator. In that regard, the RFID data response from the RFID system 40, 41 may be somewhat closer in time to the returned TDR reflection. Depending on how many elements are to be interrogated and measured, stronger RFID signals or multiple RFID signals might be utilized to charge the various systems 40, 41 before they are triggered with a TDR pulse.

In accordance with another aspect of the invention, to assist in processing the TDR information and RFID data associated with various signal paths and various passive network elements, the RFID systems 40, 41 might be selectively controlled to be turned ON and OFF, as desired, for making specific measurements. In that way, the processing circuitry, whether associated with the interrogator 52 or controller 50 or a slave interrogator 41, might be able to control which passive elements are sending RFID data that is correlated with reflections so as to more accurately characterize the system.

While the disclose embodiments illustrated utilization of the invention on the covered side of a distributed antenna system, such as at the various remote unit 12, the present invention might also be used to identify and characterize the passive network on the donor side, such as between the distributed antenna system, and the feeding base transceiver stations (BTS), or other signal sources. Therefore, the present invention is utilized in characterizing various passive networks, regardless of their location within a distributed antenna system.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

Example Embodiments

Example 1 includes a distributed antenna system comprising: a plurality of remote antenna units, a first passive element coupled to at least one of the remote antenna units at a connection juncture; an RFID system associated with the first passive element and having RFID data identifying the first passive element; an interrogator unit associated with the remote antenna unit, the interrogator unit configured for generating a least one signal for transmission to the passive element to be reflected at the connection juncture and received at the interrogator unit; the interrogator unit configured for generating at least one signal for transmission to the RFID system to obtain the RFID data identifying the passive element; processing circuitry for processing the reflected signal and for measuring a parameter of the first passive element, the processing circuitry further configured for correlating the measured parameter with the RFID data for the passive element.

Example 2 includes the distributed antenna system of Example 1 wherein the processing circuitry is configured for processing the reflected signal using a time domain reflectometry method.

Example 3 includes any of the distributed antenna systems of Examples 1-2, wherein the at least one signal of the interrogator that is to be reflected and the at least one signal of the interrogator to obtain the RFID data are the same signal.

Example 4 includes any of the distributed antenna systems of Examples 1-3 wherein the at least one signal of the interrogator that is to be reflected and the at least one signal of the interrogator to obtain the RFID data are different signals.

Example 5 includes any of the distributed antenna systems of Examples 1-4 wherein the interrogator is part of the remote antenna unit.

Example 6 includes any of the distributed antenna systems of Examples 1-5 further comprising a second passive element coupled with the first passive element at a connection juncture and an RFID system associated with the second passive element and having RFID data identifying the second passive element.

Example 7 includes the distributed antenna system of Example 6 further comprising a second interrogator unit associated with the first passive element and configured for generating at least one signal for transmission to the second passive element to be reflected at the second passive element connection juncture.

Example 8 includes the distributed antenna system of Example 7 wherein the first interrogator unit is configured for receiving the signal reflected at the second passive element connection juncture, the processing circuitry processing the reflected signal for measuring a parameter of the second passive element.

Example 9 includes the distributed antenna system of Example 8, the second interrogator unit is configured for generating at least one signal for transmission to the RFID system of the second passive element to obtain the RFID data identifying the second passive element, the processing circuitry further configured for correlating the measured parameter of the second passive element with the RFID data for the second passive element.

Example 10 includes a method of characterizing a first passive element of a distributed antenna system that comprises a plurality of remote antenna units, the first passive element coupled to at least one of the remote antenna units at a connection juncture, the method comprising: generating, by an interrogator unit associated with the remote antenna unit, at least one signal for transmission to the passive element to be reflected at the connection juncture and received at the interrogator unit; generating, by the interrogator unit, at least one signal for transmission to an RFID system associated with the first passive element, to obtain RFID data identifying the first passive element; processing the reflected signal and measuring a parameter of the first passive element; and correlating the measured parameter with the RFID data for the passive element.

Example 11 includes the method of Example 10 further comprising processing the reflected signal using a time domain reflectometry method.

Example 12 includes any of the methods of Examples 10-11 wherein the at least one signal of the interrogator that is to be reflected and the at least one signal of the interrogator to obtain the RFID data are the same signal.

Example 13 includes any of the methods of Examples 10-12 wherein the at least one signal of the interrogator that is to be reflected and the at least one signal of the interrogator to obtain the RFID data are different signals.

Example 14 includes any of the methods of Examples 10-13 wherein the interrogator is part of the remote antenna unit.

Example 15 includes any of the methods of Examples 10-14 wherein a second passive element is coupled with the first passive element at a connection juncture, and a second RFID system is associated with the second passive element and having RFID data identifying the second passive element.

Example 16 includes the method of Example 15 further comprising generating at least one signal for transmission to the second passive element to be reflected at the second passive element connection juncture.

Example 17 includes the method of Example 16, wherein the at least one signal for transmission to the second passive element is generated by a second interrogator unit associated with the first passive element.

Example 18 includes the method of Example 17 further comprising: receiving, by the first interrogator unit, the signal reflected at the second passive element connection juncture; and processing the reflected signal for measuring a parameter of the second passive element.

Example 19 includes the method of Example 18 further comprising: generating, by the second interrogator unit, at least one signal for transmission to the RFID system of the second passive element to obtain the RFID data identifying the second passive element; and correlating the measured parameter of the second passive element with the RFID data for the second passive element.

What is claimed is:

1. A distributed antenna system comprising:
   a plurality of remote antenna units, a first passive element coupled to at least one of the remote antenna units at a connection juncture;
   an RFID system associated with the first passive element and having RFID data identifying the first passive element;
   an interrogator unit associated with the remote antenna unit, the interrogator unit configured to generate a least one signal for transmission to the passive element to be reflected at the connection juncture and received at the interrogator unit;
   the interrogator unit configured to generate at least one signal for transmission to the RFID system to obtain the RFID data identifying the passive element;
   processing circuitry configured to process the reflected signal and to measure a parameter of the first passive element, the processing circuitry further configured to correlate the measured parameter with the RFID data for the passive element.

2. The distributed antenna system of claim 1 wherein the processing circuitry is configured to process the reflected signal using a time domain reflectometry method.

3. The distributed antenna system of claim 1 wherein the at least one signal of the interrogator that is to be reflected and the at least one signal of the interrogator to obtain the RFID data are the same signal.

4. The distributed antenna system of claim 1 wherein the at least one signal of the interrogator that is to be reflected and the at least one signal of the interrogator to obtain the RFID data are different signals.

5. The distributed antenna system of claim 1 wherein the interrogator is part of the remote antenna unit.

6. The distributed antenna system of claim 1 further comprising a second passive element coupled with the first passive element at a connection juncture and an RFID system associated with the second passive element and having RFID data identifying the second passive element.

7. The distributed antenna system of claim 6 further comprising a second interrogator unit associated with the first passive element and configured to generate at least one signal for transmission to the second passive element to be reflected at the second passive element connection juncture.

8. The distributed antenna system of claim 7 wherein the first interrogator unit is configured to receive the signal reflected at the second passive element connection juncture, the processing circuitry configured to process the reflected signal in order to measure a parameter of the second passive element.

9. The distributed antenna system of claim 8, the second interrogator unit is configured to generate at least one signal for transmission to the RFID system of the second passive element to obtain the RFID data identifying the second passive element, the processing circuitry further configured to correlate the measured parameter of the second passive element with the RFID data for the second passive element.

10. A method of characterizing a first passive element of a distributed antenna system that comprises a plurality of remote antenna units, the first passive element coupled to at least one of the remote antenna units at a connection juncture, the method comprising:
    generating, by an interrogator unit associated with the remote antenna unit, at least one signal for transmission to the passive element to be reflected at the connection juncture and received at the interrogator unit;
    generating, by the interrogator unit, at least one signal for transmission to an RFID system associated with the first passive element, to obtain RFID data identifying the first passive element;
    processing the reflected signal and measuring a parameter of the first passive element; and
    correlating the measured parameter with the RFID data for the passive element.

11. The method of claim 10 further comprising processing the reflected signal using a time domain reflectometry method.

12. The method of claim 10 wherein the at least one signal of the interrogator that is to be reflected and the at least one signal of the interrogator to obtain the RFID data are the same signal.

13. The method of claim 10 wherein the at least one signal of the interrogator that is to be reflected and the at least one signal of the interrogator to obtain the RFID data are different signals.

14. The method of claim 10 wherein the interrogator is part of the remote antenna unit.

15. The method of claim 10 wherein a second passive element is coupled with the first passive element at a connection juncture, and a second RFID system is associated with the second passive element and having RFID data identifying the second passive element.

16. The method of claim 15 further comprising generating at least one signal for transmission to the second passive element to be reflected at the second passive element connection juncture.

17. The method of claim 16, wherein the at least one signal for transmission to the second passive element is generated by a second interrogator unit associated with the first passive element.

18. The method of claim 17 further comprising:
receiving, by the first interrogator unit, the signal reflected at the second passive element connection juncture; and
processing the reflected signal for measuring a parameter of the second passive element.

19. The method of claim 18 further comprising:
generating, by the second interrogator unit, at least one signal for transmission to the RFID system of the second passive element to obtain the RFID data identifying the second passive element; and
correlating the measured parameter of the second passive element with the RFID data for the second passive element.

* * * * *